US012567707B2

(12) United States Patent
Burris et al.

(10) Patent No.: US 12,567,707 B2
(45) Date of Patent: Mar. 3, 2026

(54) DEVICES, ASSEMBLIES, AND METHODS FOR TERMINATING COAXIAL RADIOFREQUENCY PORTS

(71) Applicant: CORNING OPTICAL COMMUNICATIONS RF LLC, Glendale, AZ (US)

(72) Inventors: Donald Andrew Burris, Peoria, AZ (US); Thomas Edmond Flaherty, IV, Surprise, AZ (US); Jorgen Mitchell Hansen, Mesa, AZ (US); David Jeffrey Malouf, Surprise, AZ (US); Casey Roy Stein, Surprise, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 607 days.

(21) Appl. No.: 17/989,762

(22) Filed: Nov. 18, 2022

(65) Prior Publication Data

US 2023/0163537 A1 May 25, 2023

Related U.S. Application Data

(60) Provisional application No. 63/281,877, filed on Nov. 22, 2021.

(51) Int. Cl.

| | |
|---|---|
| ***H01R 24/40*** | (2011.01) |
| ***H01R 43/16*** | (2006.01) |
| *H01R 103/00* | (2006.01) |

(52) U.S. Cl.

CPC ............. *H01R 24/40* (2013.01); *H01R 43/16* (2013.01); *H01R 2103/00* (2013.01)

(58) Field of Classification Search

CPC ..... H01R 24/40; H01R 43/16; H01R 2103/00

(Continued)

(56) References Cited

U.S. PATENT DOCUMENTS

| | | |
|---|---|---|
| 3,486,221 A | 12/1969 | Preston |
| 3,519,979 A | 7/1970 | William |

(Continued)

FOREIGN PATENT DOCUMENTS

| | | |
|---|---|---|
| DE | 2604972 A1 | 8/1977 |
| DE | 3816913 A1 | 11/1989 |

(Continued)

OTHER PUBLICATIONS

Tsai et al; "Low Dielectric Polyimide/Poly(Silsesquioxane)-Like Nanocomposite Material"; Polymer, 42 (2001); pp. 4197-4207.

*Primary Examiner* — Peter G Leigh

(74) *Attorney, Agent, or Firm* — Tamika A. Crawl-Bey

(57) ABSTRACT

A coaxial terminator for terminating a coaxial equipment port includes a female connector, an outer housing, at least one support element, a center conductor, cured resin dielectric, and one or more resistive elements. The female connector is disposed within the outer housing, is supported within the outer housing by the at least one support element, and is configured to receive a male pin of the coaxial equipment port. The center conductor has a proximal portion and a distal portion and is coaxially coupled to the female connector at the proximal portion and encircled by cured resin dielectric at the distal portion. The cured resin dielectric is cured in place between the center conductor and the outer housing. The one or more resistive elements are in electrical communication at a first end with the center conductor and at a second end with the inner housing.

21 Claims, 5 Drawing Sheets

(58) Field of Classification Search
USPC .......................................................... 439/578
See application file for complete search history.

(56) References Cited

U.S. PATENT DOCUMENTS

| | | | | | |
|---|---|---|---|---|---|
| 3,573,702 | A | | 4/1971 | O'Keefe | |
| 3,768,063 | A | * | 10/1973 | Coffman | H01R 13/6473 439/301 |
| 3,845,454 | A | | 10/1974 | Hayward et al. | |
| 3,890,028 | A | * | 6/1975 | Blanchenot | H01R 43/26 192/65 |
| 4,238,641 | A | | 12/1980 | Planting et al. | |
| 4,469,386 | A | | 9/1984 | Ackerman | |
| 4,714,432 | A | | 12/1987 | Huggins | |
| 4,841,101 | A | | 6/1989 | Pollock | |
| 4,897,008 | A | | 1/1990 | Parks | |
| 4,913,673 | A | | 4/1990 | Kobler | |
| 5,011,422 | A | * | 4/1991 | Yeh | H01R 24/44 439/304 |
| 5,055,060 | A | | 10/1991 | Down et al. | |
| 5,106,312 | A | * | 4/1992 | Yeh | H01R 24/42 439/307 |
| 5,179,877 | A | | 1/1993 | Down et al. | |
| 5,217,391 | A | | 6/1993 | Fisher, Jr. | |
| 5,273,444 | A | | 12/1993 | Down et al. | |
| 5,435,736 | A | * | 7/1995 | McMills | H01R 24/42 439/578 |
| 5,436,994 | A | | 7/1995 | Ott et al. | |
| 5,535,512 | A | | 7/1996 | Armogan | |
| 5,563,562 | A | | 10/1996 | Szwec | |
| 5,564,938 | A | | 10/1996 | Shenkal et al. | |
| 5,655,915 | A | | 8/1997 | McMills et al. | |
| 5,879,610 | A | | 3/1999 | Beinhaur et al. | |
| 5,887,452 | A | | 3/1999 | Smith et al. | |
| 5,904,596 | A | | 5/1999 | Knaus et al. | |
| 6,037,539 | A | | 3/2000 | Kilgo et al. | |
| 6,089,912 | A | | 7/2000 | Tallis et al. | |
| 6,115,227 | A | * | 9/2000 | Jones | H01Q 1/50 361/127 |
| 6,334,791 | B1 | | 1/2002 | Yeh | |
| 6,491,546 | B1 | | 12/2002 | Perry | |
| 6,720,933 | B2 | | 4/2004 | Hanlin et al. | |
| 6,751,081 | B1 | * | 6/2004 | Kooiman | H01T 4/08 361/120 |
| 6,776,912 | B2 | | 8/2004 | Baurmeister | |
| 6,887,103 | B2 | | 5/2005 | Montena et al. | |
| 7,011,529 | B2 | | 3/2006 | Oldfield et al. | |
| 7,128,604 | B2 | * | 10/2006 | Hall | H01R 24/542 439/485 |
| 7,144,271 | B1 | * | 12/2006 | Burris | H01R 13/5219 439/578 |
| 7,144,274 | B2 | | 12/2006 | Taylor | |
| 7,488,210 | B1 | * | 2/2009 | Burris | H01R 24/44 439/578 |
| 7,803,018 | B1 | * | 9/2010 | Islam | H01R 24/566 439/578 |
| 8,027,136 | B2 | * | 9/2011 | Penwell | H01T 4/08 361/119 |
| 8,125,752 | B2 | * | 2/2012 | Montena | H01T 4/08 361/120 |
| 8,134,818 | B2 | * | 3/2012 | Alkan | H01P 1/202 361/119 |
| 8,231,406 | B2 | * | 7/2012 | Burris | H01R 24/44 439/620.21 |
| 8,378,239 | B2 | | 2/2013 | Lakner et al. | |
| 8,553,386 | B2 | * | 10/2013 | Penwell | H01T 4/08 361/119 |
| 9,021,960 | B1 | * | 5/2015 | Cahayla | H02G 3/22 102/472 |
| 9,130,328 | B1 | | 9/2015 | Huang et al. | |
| 9,590,287 | B2 | * | 3/2017 | Burris | H01T 4/10 |
| 9,768,543 | B2 | * | 9/2017 | Taylor | H01R 43/20 |
| 9,774,173 | B2 | * | 9/2017 | Wild | H01R 24/48 |
| 10,707,595 | B2 | * | 7/2020 | Flaherty, IV | H01R 12/91 |
| 10,723,648 | B2 | | 7/2020 | De et al. | |
| 2002/0132898 | A1 | | 9/2002 | Takaya et al. | |
| 2003/0153204 | A1 | | 8/2003 | Hirose | |
| 2004/0042149 | A1 | * | 3/2004 | Devine | H01Q 1/50 361/119 |
| 2005/0277331 | A1 | * | 12/2005 | Hall | H01R 24/542 439/578 |
| 2006/0258209 | A1 | * | 11/2006 | Hall | H01R 43/20 439/578 |
| 2007/0074896 | A1 | | 4/2007 | Tanaka et al. | |
| 2007/0097583 | A1 | * | 5/2007 | Harwath | H01R 24/48 361/118 |
| 2007/0231581 | A1 | | 10/2007 | Lin et al. | |
| 2010/0233903 | A1 | * | 9/2010 | Islam | H01R 13/15 439/578 |
| 2013/0052855 | A1 | | 2/2013 | Komatsubara | |
| 2013/0189513 | A1 | | 7/2013 | Dreezen et al. | |
| 2014/0268469 | A1 | * | 9/2014 | Wild | H01R 24/48 361/118 |
| 2017/0162958 | A1 | | 6/2017 | Laighton et al. | |
| 2019/0109419 | A1 | | 4/2019 | Garcia et al. | |
| 2019/0148851 | A1 | | 5/2019 | Flaherty, IV | |
| 2019/0165536 | A1 | | 5/2019 | Dawes et al. | |
| 2022/0102924 | A1 | | 3/2022 | Collins et al. | |

FOREIGN PATENT DOCUMENTS

| | | | |
|---|---|---|---|
| DE | 29512537 | U1 | 9/1995 |
| EP | 1337134 | A2 | 8/2003 |
| TW | 201842715 | A | 12/2018 |
| WO | 2019/104010 | A1 | 5/2019 |

* cited by examiner

DEVICES, ASSEMBLIES, AND METHODS FOR TERMINATING COAXIAL RADIOFREQUENCY PORTS

RELATED APPLICATION

This application claims priority under 35 U.S.C. § 119 to U.S. Provisional Application No. 63/281,877, filed Nov. 22, 2021, which is incorporated herein by reference in its entirety.

BACKGROUND

The present specification generally relates to radiofrequency termination and, more particularly, to devices, assemblies, and methods for terminating coaxial radiofrequency ports.

Radiofrequency ("RF") signals may be transmitted through cables or lines to various destinations. Within coaxial cable systems, such coaxial lines may be coupled at their ends to equipment boxes, such as signal splitters, amplifiers, etc. These equipment boxes may have several coaxial ports adapted to receive end connectors of coaxial cables. If one or more of such coaxial ports is to be left "open", such that a connection to further transmit the signal is not secured to the port, then it may be necessary to "terminate" such port with a coaxial terminator. If such a coaxial terminator is omitted, then undesired reflected signals may interfere with the proper transmission of the desired RF signal. Moreover, due to high frequency signals (e.g., 100 GHz) it may be difficult to effectively terminate the signal and prevent interference with existing terminators.

Accordingly, a need exists for RF terminators with improved high frequency performance.

SUMMARY

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

In a first aspect A1, a coaxial terminator for terminating a coaxial equipment port includes a female connector, an outer housing, at least one support element, a center conductor, cured resin dielectric, and one or more resistive elements. The female connector is disposed within the outer housing, is supported within the outer housing by the at least one support element, and is configured to receive a male pin of the coaxial equipment port. The center conductor has a proximal portion and a distal portion and is coaxially coupled to the female connector at the proximal portion and encircled by cured resin dielectric at the distal portion. The cured resin dielectric is cured in place between the center conductor and the outer housing. The one or more resistive elements are in electrical communication at a first end with the center conductor and at a second end with the inner housing.

In a second aspect A2 according to the first aspect A1, a gap is disposed between the one or more resistive elements and the outer housing. In a third aspect according to the second aspect A2, the terminator further comprises a tuning screw threadedly engaged with the outer housing, wherein advancing tuning screw decreases the gap, thereby adjusting the inductance of the coaxial terminator. In a fourth aspect A4 according to any preceding aspect, the coaxial terminator further includes an inner housing encircling the cured resin dielectric, wherein the inner housing is formed of a conductive material and is positioned coaxially within the outer housing such that the inner housing and the outer housing are in electrical communication. In a fifth aspect A5 according to any preceding aspect, the outer housing comprises a first portion and a second portion press-fit within the first portion. In a sixth aspect A6 according to any preceding aspect, the at least one support element comprises dielectric material. In a seventh aspect A7 according to any preceding aspect, the at least one support element includes a first support element and a second support element, and the first support element maintains a coaxial orientation of the female connector relative to the outer housing. In an eight aspect A8 according to the seventh aspect A7, the second support element maintains a coaxial orientation of the female connector relative to the center conductor. In a ninth aspect A9 according to any preceding aspect, the center conductor is press-fit within the female connector. In a tenth aspect A10 according to any preceding aspect, the one or more resistive elements are made of a conductive particulate suspended within the cured resin dielectric.

In an eleventh aspect A11, a coaxial terminator for terminating a coaxial equipment port includes a female connector, an outer housing, at least one support element, a center conductor, cured resin dielectric, an inner housing, and one or more resistors. The female connector is disposed within the outer housing, is supported within the outer housing by the at least one support element, and is configured to receive a male pin of the coaxial equipment port. The center conductor has a proximal portion and a distal portion and is coaxially coupled to the female connector at the proximal portion and encircled by cured resin dielectric at the distal portion. The cured resin dielectric is cured in place between the center conductor and the outer housing. The one or more resistors are in electrical communication at a first end with the center conductor and at a second end with the outer housing.

In a twelfth aspect A12 according to the eleventh aspect A11, the one or more resistors includes a first resistor and a second resistor, wherein each of the first resistor and the second resistor are in electrical communication with the center conductor and the outer housing such that the first resistor and the second resistor operate in parallel. In a thirteenth aspect A13 according to the twelfth aspect A12, the center conductor defines a longitudinal axis, wherein the first resistor and the second resistor are directionally oriented radially away from the longitudinal axis. In a fourteenth aspect A14 according to any of the eleventh through thirteenth aspects A11-A13, the one or more resistors are soldered at a first end to the center conductor and at a second end to an inner housing, wherein the cured resin dielectric is cured in place within the inner housing. In a fifteenth aspect A15 according to any of the eleventh through thirteenth aspects A11-A13, the coaxial terminator further includes a distal dielectric disposed within an inner housing, wherein the one or more resistors are in electrical communication at the first end to the center conductor and at the second end to the inner housing. In a sixteen aspect A16 according to any of the fourteenth through fifteenth aspects A14-A15, the coaxial terminator further includes a spring extending between the inner housing and the outer housing. In a seventeenth aspect A17 according to any of the eleventh through sixteenth aspects A11-A16, the one or more resistors includes a chip resistor.

In an eighteenth aspect A18, a method of assembling a coaxial terminator includes positioning an inner housing about a distal portion of a center conductor, injecting a resin dielectric into the inner housing such that it is encircling the distal portion of the center conductor, curing the resin dielectric about the distal portion of the center conductor, coupling a first resistor at a first end to the center conductor and at a second end to the inner housing such that the first resistor is in electrical communication with the center conductor and the inner housing, and enclosing the center conductor, the resin dielectric, and the first resistor within an outer housing.

In a nineteenth aspect A19 according to the eighteenth aspect A18, the method further includes coaxially coupling a proximal portion of the center conductor to a female connector, wherein the female connector is configured to receive a male pin of the coaxial equipment port. In a twentieth aspect A20 according to either the eighteenth aspect A1b or the nineteenth aspect A19, the method further includes coupling a second resistor to the center conductor and the inner housing such that the second resistor is in electrical communication with the center conductor and the inner housing.

In a twenty-first aspect A21, a coaxial terminator for terminating a coaxial equipment port includes a center conductor, an outer housing, at least one support element, and a resistive element. The center conductor has a proximal portion and a distal portion, and the proximal portion includes a female connector. The at least one support element supports the center conductor axially within the outer housing. The resistive element electrically couples the center conductor to the outer housing. The resistive element comprises a cured resin dielectric and a conductive particulate suspended within the cured resin dielectric.

In a twenty-second aspect A22 according to the twenty-first aspect A21, the outer housing and the center conductor define an injection passage extending therethrough, wherein the resistive element is disposed within the injection passage. In a twenty-third aspect A23 according to the twenty-first or twenty-second aspect A21-A22, the resistive element encircles a portion of the center conductor. In a twenty-fourth aspect A24 according to any of the twenty-first through twenty-third aspects A21-A23, the resistive element is injected into a space abutting the center conductor and cured in place. In a twenty-fifth aspect A25 according to any of the twenty-first through twenty-fourth aspects A21-A24 the resistive element has a resistance of 50 ohms.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
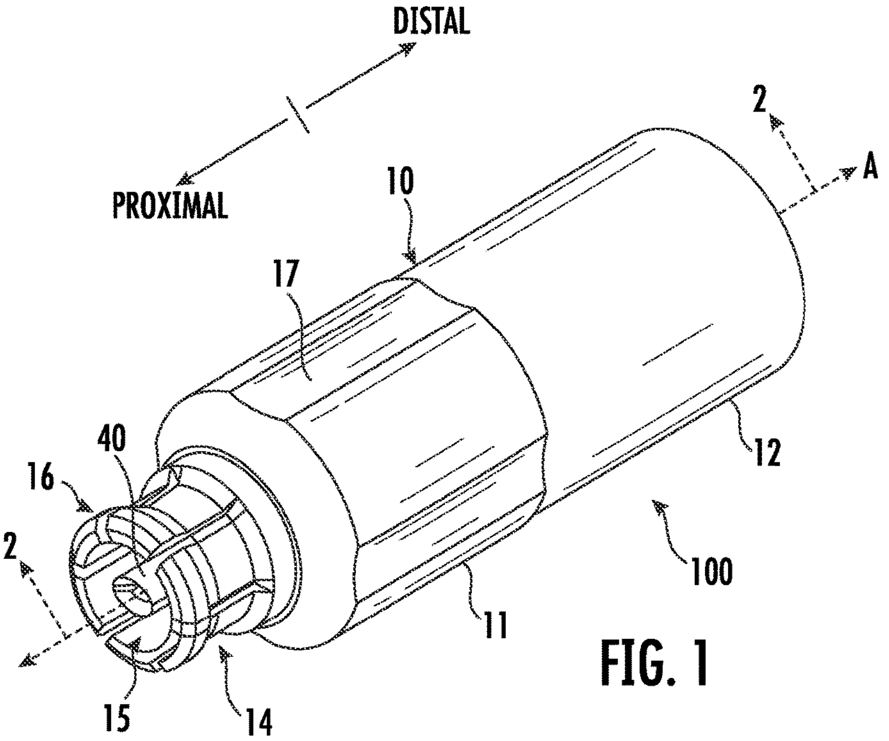
FIG. 1 schematically illustrates a perspective view of a coaxial RF terminator, according to one or more embodiments shown and described herein.

Reference will now be made in detail to various embodiments of devices, assemblies, and methods, examples of which are illustrated in the accompanying drawings. Whenever possible, the same reference numerals will be used throughout the drawings to refer to the same or like parts.

Figure 2:
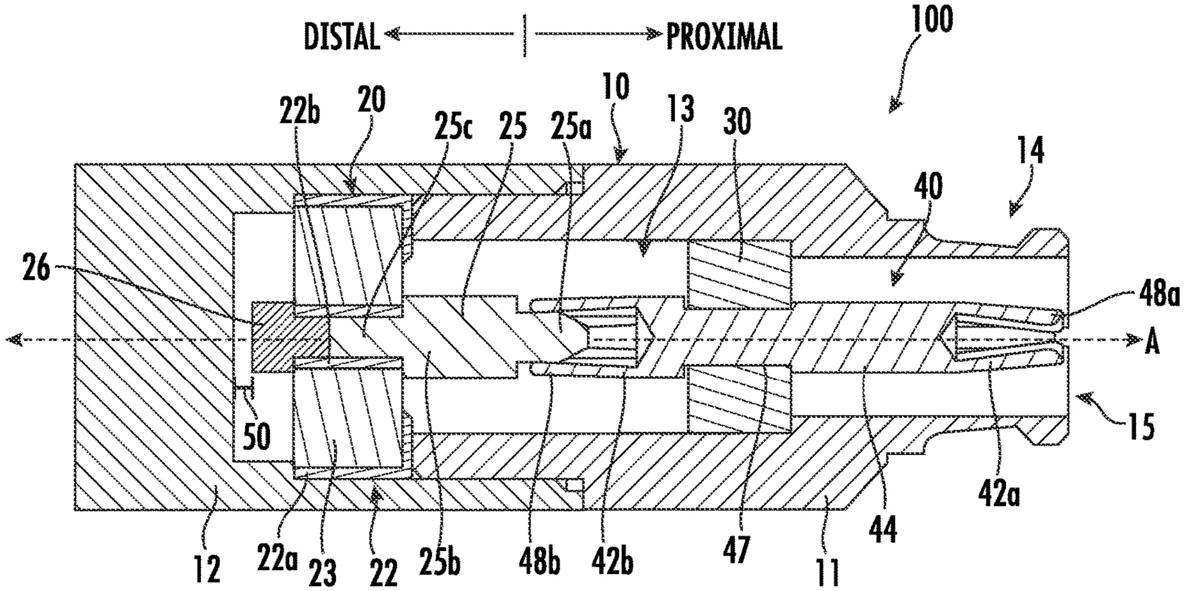
FIG. 2 schematically illustrates a cross-sectional view of the coaxial RF terminator of FIG. 1, according to one or more embodiments shown and described herein.

Referring generally to FIGS. 1-2, a coaxial RF terminator is schematically depicted. The RF terminator may generally include a female connector, an outer housing, at least one support element, a center conductor, a cured resin dielectric, and one or more resistive elements. The female connector is configured to receive a male pin of a coaxial equipment port (not shown) and is disposed within the outer housing and is supported within the outer housing by the at least one support element. The center conductor may include a proximal portion and a distal portion and may be coaxially coupled to the female connector at the proximal portion and encircled by the cured resin dielectric at the distal portion. The cured resin dielectric is cured in place between the center conductor and the outer housing. The one or more resistive elements may be mounted to the center conductor and may be in electrical communication at a first end with the center conductor and at a second end with the outer housing. In this way, an RF signal received from the male pin may travel through the female connector, through the center conductor, through the resistive element, and then to the outer housing, which may be grounded, such that the RF signal is terminated with minimal reflection. As noted above, the cured dielectric resin may be cured in place thereby filling substantially all of the voids between the center conductor and the outer housing or any intervening components, thus providing improved signal isolation and termination. This and other embodiments will be described in greater detail below.

Directional terms as used herein—for example up, down, right, left, front, back, top, bottom—are made only with reference to the figures as drawn and are not intended to imply absolute orientation unless otherwise specified. The terms proximal and distal are used herein to reference a direction toward a coaxial equipment port and away from a coaxial equipment port, respectively.

Unless otherwise expressly stated, it is in no way intended that any method set forth herein be construed as requiring that its steps be performed in a specific order, nor that any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

Referring now to FIGS. 1 and 2, an embodiment of an RF terminator 100 is schematically depicted. As described herein, a terminator may be used to terminate an RF (such as microwave) signal. For example, coaxial transmission mediums for conveying information at microwave frequencies may be characterized by their relatively small size, which is not only a consequence of the operation frequency range, but may also be attributable to application and environments of the systems in which such communications are employed. For example, such systems may be found in sophisticated radars with multiple ports in which size and/or weight restrictions may result in a desire for reductions in size and/or weight. In multiple-port radars, any unused ports may need an RF terminator to prevent a transmission line open circuit, outside, signal reflection, and/or outside or spurious signal ingress, which could otherwise interfere with the system. The RF terminator 100 generally includes an outer housing 10, a female connector 40, and a resistor assembly 20 (depicted in FIG. 2). The RF terminator 100 generally defines a coaxial connection axis A along which RF signals are transmitted and which may be used to spatially describe various components of the RF terminator 100. It is noted that a greater or fewer of components may be included within the RF terminator 100 without departing from the scope of the present disclosure.

The outer housing 10 generally defines the exterior of the RF terminator 100 and may include a port end 14 for receiving an RF transmission line (e.g., a male connector), which is coaxial with the coaxial connection axis A. In some embodiments, the outer housing 10 may form a single structure or in other embodiments, the outer housing 10 may generally include a first portion 11 and a second portion 12 couplable to the first portion 11. For example, the first portion 11 and second portion 12 may be coupled with a press-fit connection, threaded connection, adhesive, weld, brazing, or any other suitable connection. For example, and as illustrated in FIG. 2, the second portion 12 may be received within the first portion 11 (or vice versa) to couple the first portion 11 to the second portion 12. The outer housing 10 may define an outer housing volume 13, which houses various internal components of the RF terminator 100, described in greater detail below. The outer housing 10 may be formed of one or more conductive materials (e.g., copper, gold, silver, platinum, nickel, or the like). The outer housing 10 may be formed via casting, additive manufacturing, etc. In some embodiments, the outer housing 10 may be formed of a base material (conductive or not) coated with one or more conductive coatings (e.g., copper, gold, silver, platinum, nickel, or the like).

In embodiments the port end 14 may form part of the first portion 11 of the housing and may be positioned proximally the second portion 12. The port end 14 may generally define a port 15 that may include a plurality of radial slits 16 as depicted which may provide radial flexibility to the port 15, thereby providing improved connection to a port of an equipment box (not depicted). The plurality of radial slits 16 may include any number such as two or more slits, four or more slits, etc.

In embodiments, one or more gripping features 17 may be formed on an outer surface of the outer housing 10. The one or more gripping features 17 (e.g., ribs, edges, etc.), may provide improved assembly and/or handling of the outer housing 10. The one or more gripping features 17 may be formed on the first portion 11 (as depicted), the second portion 12, or both.

FIG. 2 generally depicts a cross-sectional view of the RF terminator 100 taken along line 2-2 of FIG. 1, inside of the outer housing 10, which may house the female connector 40 and the resistor assembly 20. The female connector 40 may be positioned within the outer housing 10. For example, the female connector 40 may extend concentrically within the outer housing 10 along the coaxial connection axis A. In embodiments, the female connector 40 defines a first female connecting end 42*a* and a second female connecting end 42*b* opposite the first female connecting end 42*a*. However, other configurations are contemplated and possible. In the illustrated embodiment, the first female connecting end 42*a* is pointed concentrically within the port 15 of the port end 14 for receiving a male connector of an equipment port (not shown).

In embodiments, the female connector 40 may be formed from a conductive material such as, but not limited to, copper, gold, silver, platinum, nickel, etc. In embodiments, the female connector 40 may be a solid metal material, which may be formed via casting, additive manufacturing, etc. In some embodiments, the female connector 40 may be a metal material and have one or more conductive coatings applied thereto (e.g., copper, gold, silver, platinum, nickel, or the like).

The female connector 40 may have a female connector hub 44 from which the first female connecting end 42*a* and the second female connecting end 42*b* extend. The female connector hub 44 may define a recess 47 for receiving a support element (e.g., support element 30), as will be described in greater detail below. Each of the first female connecting end 42*a* and the second female connecting end 42*b* may define two or more fingers 48*a*, 48*b*. Separation between the two or more fingers 48*a*, 48*b*, may provide radial flexibility to the first female connecting end 42*a* and the second female connecting end 42*b* to allow the first female connecting end 42*a* and the second female connecting end 42*b* to clamp onto a received male mating feature.

As noted above, also positioned within the outer housing 10 is the resistor assembly 20. The resistor assembly 20 may be positioned distal to the port end 14 of the outer housing 10 and the female connector 40. In embodiments, the resistor assembly 20 may be electrically coupled to the second female connecting end **42*b*, as shown. In general, the resistor assembly 20 may include an inner housing 22, center conductor 25, one or more resistive elements (such as resistive element 21, depicted in FIG. 3), and cured resin dielectric 23. Alternatively, a dielectric material, such as PCB, may be shaped prior to assembly and assembled in place. It is noted that a greater or fewer of components may be included within the resistor assembly 20** without departing from the scope of the present disclosure.

In embodiments, the inner housing 22 may be formed from a conductive material such as, but not limited to, copper, gold, silver, platinum, nickel, etc. The inner housing 22 may be a solid metal material, which may be formed via casting, additive manufacturing, etc. In some embodiments, the inner housing 22 may be a metal material and have one or more platings applied thereto (e.g., gold, copper, etc.). Still referring to FIG. 2, the inner housing 22 may have an outer wall **22*a* and an inner wall 22*b*. As will be described in more detail herein, the outer wall 22*a* of inner housing 22 may be positioned within the second portion 12 of the outer housing 10. Accordingly, the outer wall 22*a* of inner housing 22 may have a geometry corresponding to that of the second portion 12 of the outer housing 10. As depicted, the outer wall 22*a* of inner housing 22 may have an L-shaped radial cross-section; however, other shapes are contemplated and possible. The inner wall 22*b* of inner housing 22 may encircle center conductor 25 and may be contacted therewith. As depicted, the inner wall 22*b* of inner housing 22 may be substantially cylindrical, though other shapes are contemplated and possible. In embodiments, the inner wall 22*b* and the outer wall 22*a* may be electrically isolated from one another such that they are not in electrical communication. For example, the inner wall 22*b* and the outer wall 22*a* may be insulated from one another via the cured resin dielectric 23**, which is described in greater detail below.

The center conductor 25 may be positioned within the inner housing 22 along the central coaxial connection axis A. In embodiments, the center conductor 25 may be formed from a conductive material such as, but not limited to, copper, gold, silver, platinum, nickel, etc. In embodiments, the center conductor 25 may be a solid metal material, which may be formed via casting, additive manufacturing, etc. In some embodiments, the center conductor 25 may be a metal material and have one or more platings applied thereto (e.g., gold, copper, etc.). The center conductor 25 may define a proximal end **25*a* and distal end 25*c*, and a central portion 25*b* extending therebetween. The center conductor 25 has a substantially round axial shape, though other shapes are contemplated and possible. The proximal end 25*a* and the distal end 25*c* may have an axial shape with a smaller diameter than the central portion 25*b*. In particular, proximal end 25*a* may have a diameter small enough to be received within a female connecting end such as the second female connecting end 42*b* of female connector 40. That is, the proximal end 25*a* may define a male connector of the center conductor 25, which is inserted into the second female connecting end 42*b* of the female connector 40**, as depicted.

Referring again to FIG. 3, the female connector 40 is coupled to the center conductor 25 of the resistor assembly 20. In particular, the female connector 40 is coaxially coupled to a center conductor 25 of the resistor assembly 20 along the coaxial connection axis A such that the female connector 40 and the center conductor 25 are in electrical communication. In the present embodiment, the female connector 40 is coaxially coupled with a press-fit or interference-fit connection to the center conductor 25. However, a threaded connection or any other appropriate coaxial connection may also be used. In the present embodiment, the female connector 40 has a female geometry at its distal end, and the center conductor 25 has a male geometry at its proximal end such that the male geometry of the center conductor 25 may be received within the female geometry of the female connector 40. However, the respective geometries may be switched. It is noted that in the embodiment, the center conductor 25 and the female connector 40 are illustrated as separate components coupled to one another. In other embodiments, the center conductor 25 and the female connector 40 may be integral with one another.

Referring again to FIG. 2, the female connector 40 may be supported within the outer housing 10 by at least one support element, such as a support element 30. The support element 30 may encircle a portion of or an entire radial perimeter of the female connector 40, such as within the recess 47 at the female connector hub 44, and extend radially outward to abut an inner wall of the outer housing 10. By placing the support element 30 within the recess 47, a position of the support element 30 along the female connector 40 may be fixed. In this way, the support element 30 helps maintain the female connector 40 in a coaxial or nearly coaxial orientation relative to the outer housing 10. Accordingly, both the outer housing 10 and the female connector 40 may be substantially centered about the coaxial connection axis A. The support element 30 may be made of an electrically insulating material such as dielectric material to prevent electrical communication through the support element 30. In particular, the support element 30 may be made of printed circuit board (PCB) material (e.g., epoxy, polyimide, Teflon, etc.). In some embodiments and as will be described in greater detail below, one or more support elements 30 may be used to support the female connector 40 within the outer housing 10, such as two or more support elements.

Figure 4A:
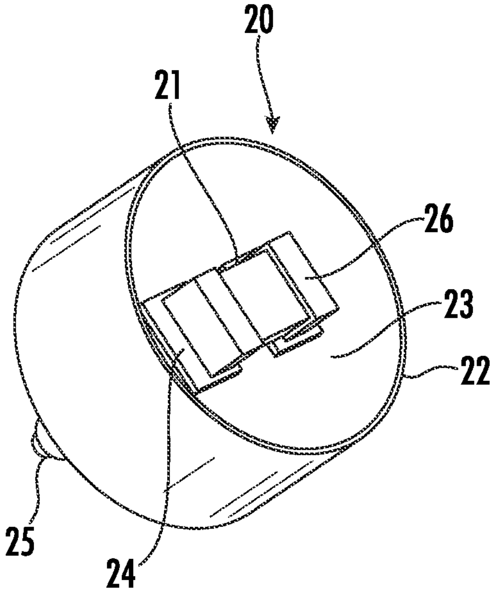
FIG. 4A schematically illustrates a perspective rear view of a resistor assembly of the terminator of FIG. 1, according to one or more embodiments shown and described herein.
Figure 4B:
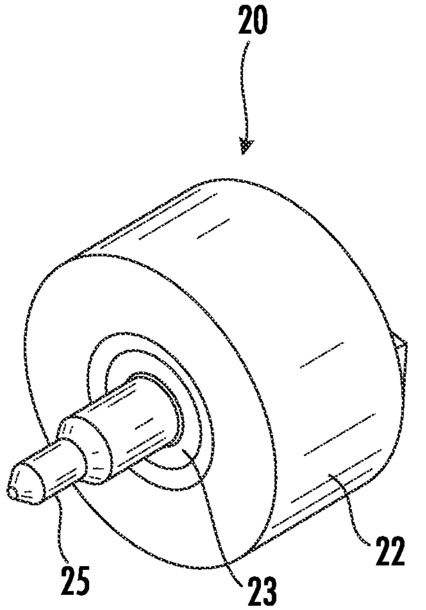
FIG. 4B schematically illustrates a perspective front view of the resistor assembly of FIG. 4A, according to one or more embodiments shown and described herein.

Referring now to FIGS. 4A and 4B, the resistor assembly 20 may have one or more resistive elements, such as a resistive element 21. The resistive element 21 may be a resistor and/or resistive material having a first terminal end 24 and a second terminal end 26 opposite the first terminal end 24. The resistive element 21 may include any commercially available resistor, such as a thick-film chip resistor, commercially available from any number of sources including Dale Electronics of Norfolk, Nebr. or Amitron of North Andover, Mass. Resistor 311, a plate resistor, a coated ceramic block, or the like. The resistive element 21 may also be a resistive material such as a conductive particulate that may be suspended in a material. For example, the resistive material could be a resin and/or epoxy material such as an epoxy phenol novolac based resin. Alternatively, the resistive material could be a ruthenium, iridium, and rhenium oxide based material. The resistive element 21 may have a characteristic resistance of 25-100 ohms, such as a 50-ohm resistor. For example, the resistance may be based on the frequency of the signal being terminated.

As depicted, the resistive element 21 may be coupled to the center conductor 25 at the second terminal end 26 such that the resistive element 21 and the center conductor 25 are in electrical communication. This may be accomplished with a solder connection or any appropriate connection that allows electrical communication. The resistive element 21 is similarly coupled to the inner housing 22 at the first terminal end 24 such that the resistive element 21 and the inner housing 22 are in electrical communication. In this way, an electrical signal may travel from the center conductor 25 though the resistive element 21 and to the inner housing 22. The resistive element 21 may be in a distal position relative to the center conductor 25 and the inner housing 22 and may be oriented in a radial direction so as to extend away from the coaxial connection axis A. For example, the resistive element 21 may either contact the coaxial connection axis A and extend directly therefrom or be radially offset from the coaxial connection axis A. If the resistive element 21 is radially offset from the coaxial connection axis A such that the resistive element 21 is not contacted to the center conductor 25, the space between the resistive element 21 and the center conductor 25 may be filled with solder material or another conductive material to maintain electrical communication between the resistive element 21 and the center conductor 25.

Still referring to FIG. 2, as noted above, the resistor assembly 20 may further include the cured resin dielectric 23. The cured resin dielectric 23 may be positioned distally of the first portion 11 of outer housing 10. The cured resin dielectric 23 may encircle a portion of center conductor 25 such as at distal end 25*c*. As depicted, cured resin dielectric 23 may extend distally past the distal end 25*c* of center conductor 25. However, as will be described in more detail herein, cured resin dielectric 23 may not extend distally past the distal end 25*c* of center conductor 25. As depicted, cured resin dielectric 23 has a shape substantially similar to a hollow cylinder. However, other geometries are contemplated and possible.

Many types of cured resin dielectric may be used to form the cured resin dielectric 23. In particular, the cured resin dielectric 23 may be an epoxy resin, a urethane resin, a silicone resin, or the like, such as an epoxy phenol novolac based resin. In some embodiments, the cured resin dielectric 23 may have a 24-hour pot life with an imidazole catalyst, which may be thermally cured in place. In some embodiments, the cured resin dielectric 23 may have a relatively low thermal curing temperature, such as between about 120° C. and 170° C., such as about 150° C. By utilizing lower curing temperatures, surface quality (e.g., plating) on various components of the resistor assembly 20 may be preserved. In embodiments, the cured resin dielectric 23 may be injected into the inner housing 22 as a liquid such that it fills space between the inner wall 22*b* and the outer wall 22*a*. In some embodiments, the inner wall 22*b* may be coupled to the center conductor 25 (e.g., via welding, brazing, or the like) or the inner wall 22*b* may be integral therewith. Using a jig or structure to hold the center conductor 25 and/or the inner wall 22*b* relative to the outer wall 22*a*, the resin dielectric may be cured in situ. In this way, the resin dielectric may be shaped to completely fill the space between the outer wall 22*a* and the inner wall 22*b* (and/or the center conductor 25). In some embodiments, there may not be an inner wall 22*b*, instead the dielectric material may be injected directly between the outer wall 22*a* of the inner housing 22 and the center conductor 25 and cured in place, thereby providing improved contact between the dielectric resin and the center conductor 25 and the dielectric resin and the inner housing 22. By curing the dielectric resin in place, air pockets may be eliminated which may otherwise reduce terminator performance. Moreover, by using a dielectric resin, which may be injected and cured in place, various geometries of the inner housing 22 and center conductor 25 may be used. Alternatively, a dielectric material, such as PCB, may be shaped prior to assembly and assembled in place.

The cured resin dielectric 23 is configured to maintain a coaxial orientation between the center conductor 25 and the outer wall 22*a* of the inner housing 22 without allowing physical contact (thereby preventing direct electrical signals) between the center conductor 25 and/or the inner wall 22*b* of the inner housing 22 with the outer wall 22*a* of the inner housing 22. In this way, an electrical signal traveling through the center conductor 25 will travel through the resistive element 21 before reaching the inner housing 22.

Referring back to FIG. 2, the resistor assembly 20 may be positioned within the outer housing 10 such that the inner housing 22 (such as the outer wall 22*a*) abuts, and is in electrical communication with, the second portion 12 of the outer housing 10. The resistor assembly 20 may be further positioned such that a gap 50 is formed distally of the resistive element 21 and between the resistive element 21 and the second portion 12 of the outer housing 10. The electrical communication with the outer housing 10 all an RF signal to travel from the resistive element 21, through the outer wall 22*a* of the inner housing 22, and to the outer housing 10. As noted above, the outer housing 10 may be operable to ground the circuit of RF terminator 100. As will be appreciated by those skilled in the art, the impedance of the circuit of RF terminator 100 may controlled in part by the volume of air defined by gap 50. Accordingly, the width of the gap 50 along the coaxial connection axis A, may be tuned to a specific desired impedance. Additional embodiments as provided herein may provide an adjustable impedance structure.

Figure 3:
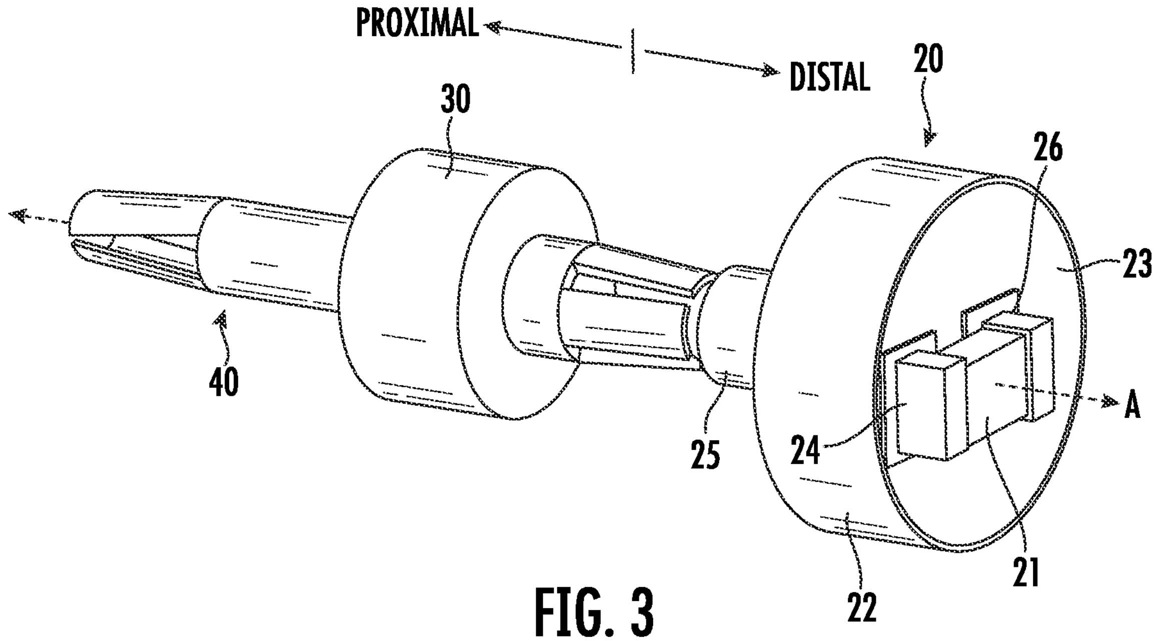
FIG. 3 schematically illustrates a perspective view of internal components of the terminator of FIG. 1, according to one or more embodiments shown and described herein.

Methods of assembling an RF terminator 100 are also disclosed herein. It is noted that methods may include a greater or fewer number of steps, in any order, without departing from the scope of the present disclosure. For example, the method includes positioning the center conductor 25 coaxially relative to the inner housing 22 as illustrated in FIGS. 4A and 4B. The method further includes injecting a resin dielectric into the inner housing 22 such that it encircles a portion of the center conductor 25 and curing the resin dielectric such that it forms a cured resin dielectric 23. As illustrated in FIGS. 4A and 4B, cured resin dielectric 23 encircles a portion of the center conductor 25 and completely fills the space between the inner housing 22 and the center conductor 25 and/or the space between the outer wall 22*a* and the inner wall 22*b* of the inner housing 22. The method further includes soldering the resistive element 21 to the center conductor 25 and the inner housing 22 at terminal ends 26 and 24, respectively. The method may further include positioning the support element 30 about the female connector 40. As shown in FIG. 3, support element 30 encircles the female connector 40 at the female connector hub 44. The method may further include coupling the second female connecting end 42*b* of female connector 40 to the proximal end 25*a* of center conductor 25. In some embodiments, the method further includes enclosing the resulting subassembly of internal components within the outer housing 10 by coupling the first portion 11 of the outer housing 10 to the second portion 12 of the outer housing 10.

As will be appreciated by those skilled in the art, the assembly need not occur in this particular order. For example, positioning the support element 30 about the female connector 40 may occur before or after coupling the second female connecting end 42*b* of female connector 40 to the proximal end 25*a* of center conductor 25. In other embodiments, and as noted above, the female connector 40 may be integrated with the center conductor 25 so as to be a single part.

Figure 5:
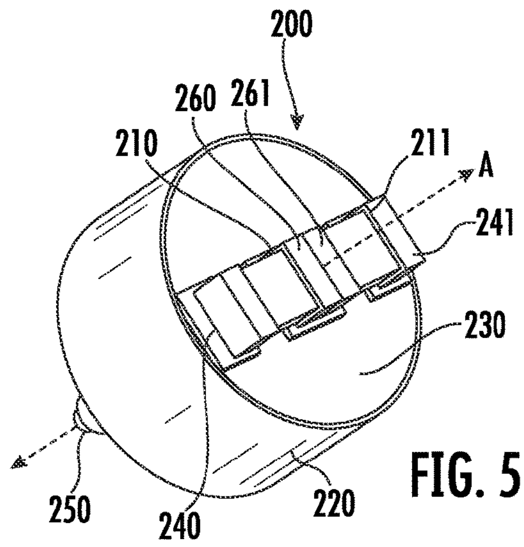
FIG. 5 schematically illustrates a perspective rear view of a resistor assembly of a coaxial RF terminator, according to one or more embodiments shown and described herein.

Referring now to FIG. 5, another embodiment of a resistor assembly 200 is schematically depicted. The resistor assembly 200 includes many of the same components as described above, accordingly the above description applies to the present embodiment, unless otherwise noted or apparent, and will not be repeated.

The resistor assembly 200 generally includes a center conductor 250, an inner housing 220, a cured resin dielectric 230, and resistive elements 210 and 211. That is, the present embodiment includes at least two resistive elements 210 and 211. In embodiments, the resistive elements 210 and 211 may be arranged in circumferential positions about the coaxial connection axis A. Accordingly, the resistive elements 210 and 211 may be directionally oriented radially away from the coaxial connection axis A. The resistive elements 210 and 211 may be arranged in-line with one another as shown. However, other positions are contemplated and possible. In embodiments, the resistive elements 210 and 211 may be arranged in electrical communication with the center conductor 250 and the inner housing 220 so that the resistive elements 210 and 211 operate in parallel, as depicted. This may be beneficial in some applications as two resistive elements operating in parallel may accommodate a greater maximum throughput power as compared to an equivalent single resistive element. For example, two 100-ohm resistors operating in parallel may accommodate a greater maximum throughput power as compared to one 50-ohm resistor operating alone. However, we note the serial arrangements are also contemplated and possible.

For example, in other embodiments, there may be three or more resistive elements. In such an embodiment, the resistive elements may be arranged in equally or unequally spaced circumferential positions about the coaxial connection axis A such that the three or more resistive elements operate in parallel. However, other configurations are contemplated and possible.

Figure 6:
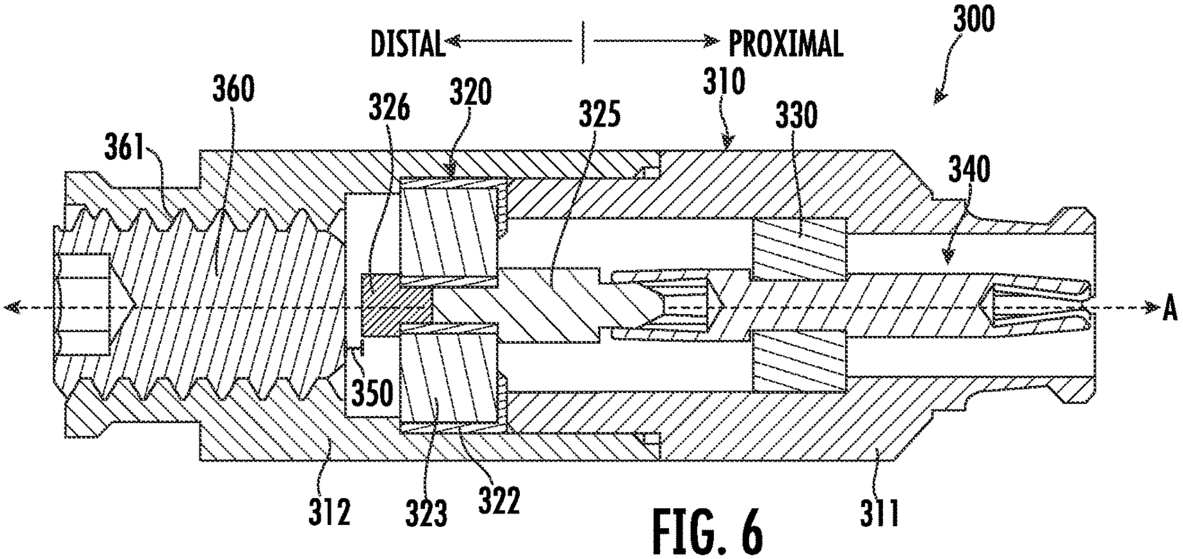
FIG. 6 schematically illustrates a cross-sectional view of a coaxial RF terminator including the resistor assembly of FIG. 5, according to one or more embodiments shown and described herein.

Referring now to FIG. 6, a cross-sectional view of an embodiment of a RF terminator 300 is schematically depicted. It is noted that the RF terminator 300 is substantially similar to the above-described RF terminator 100. Accordingly, description of like components may apply equally to the present embodiment unless otherwise noted or apparent. For the example, the RF terminator 300 generally includes an outer housing 310, which may include a first portion 311 and a second portion 312, a female connector 340, a support element 330, and a resistor assembly 320, such as described above. The resistor assembly 320 may include a center conductor 325, a resistive element 326, an inner housing 322, and cured resin dielectric 323 (and/or PCB material), such as described above. The RF terminator 300 may further include a gap 350 located distally of the resistor assembly 320 and disposed between the resistor assembly 320 and the outer housing 310.

However, in the present embodiment, the second portion 312 has a threaded distal end, having an internal thread aperture 361 that is configured to receive a tuning screw 360. Accordingly, the tuning screw 360 may be distally located relative to the resistive element 326, thereby increasing or decreasing a size of the gap 350. As will be appreciated by those skilled in the art and as noted above, the impedance of the circuit of RF terminator 300 may be controlled in part by the volume of air defined by the gap 350. This volume can be varied by distally retracting or proximally advancing the tuning screw 360. As described hereinabove, the tuning screw 360 may be threadedly engaged with the second portion 312 of the outer housing 310 and can retract or advance accordingly. The gap 350 will increase in volume when the tuning screw 360 is distally retracted and will decrease in volume when the tuning screw 360 is proximally advanced. Accordingly, by advancing or retracting the tuning screw 360, the impedance of the circuit of RF terminator 300 can be adjusted and customized for a particular application.

Figure 7:
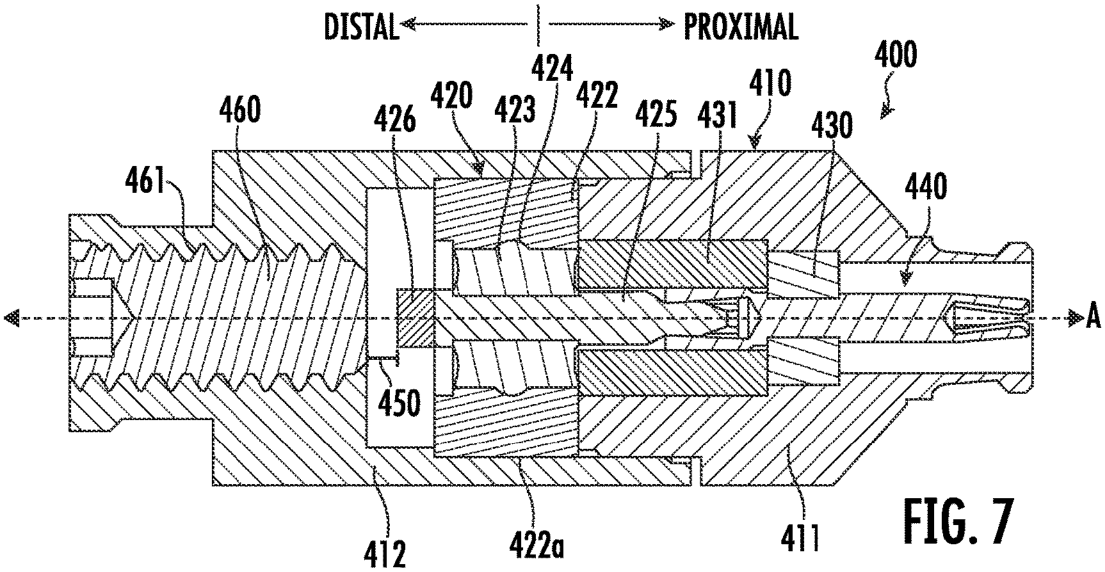
FIG. 7 schematically illustrates a cross-sectional view of a coaxial RF terminator, according to one or more embodiments shown and described herein.

Referring now to FIG. 7, a cross-sectional view of another embodiment of RF terminator 400 is schematically depicted. It is noted that the RF terminator 400 is substantially similar to the above-described RF terminator 300 and 100. Accordingly, description of like components may apply equally to the present embodiment unless otherwise noted or apparent. For the example, the RF terminator 400 generally includes an outer housing 410, which may include a first portion 411 and a second portion 412, a female connector 440, a support element 430, a resistor assembly 420, and a tuning screw 460 with a thread aperture 461. The resistor assembly 420 may include a center conductor 425, a resistive element 426, an inner housing 422, and cured resin dielectric 423 (and/or PCB material), such as described above. The RF terminator 400 may further include a gap 450 located distally of the resistor assembly 420 and disposed between the resistor assembly 420 and the outer housing 410.

In the present embodiment, the coaxial connection between the center conductor 425 and female connector 440 is additionally supported by a second support element 431. The second support element 431 encircles a portion of the center conductor 425 and a portion of the female connector 440 to help maintain the coaxial arrangement of the female connector 440 relative to the center conductor 425. The second support element 431 also extends radially to abut an inner surface of the outer housing 410. In this way, the second support element 431 also helps maintain the coaxial arrangement of the center conductor 425 and the female connector 440 relative to the outer housing 410. Accordingly, the center conductor 425, the female connector 440, and the outer housing 410 may each be substantially centered about the coaxial connection axis A. The second support element 431 may be made of dielectric material (e.g., PCB, epoxy, polyimide, Teflon, polyethylene, polyetherimide, acetal, and polyamide-imide, etc.).

In the present embodiment, the cured resin dielectric 423 is proximally recessed relative to the distal ends of inner housing 422 and center conductor 425. In this way, the resistive element 426 may not contact the cured resin dielectric 423 but may instead contact the center conductor 425 and the inner housing 422 and bridge over the cured resin dielectric 423.

In the present embodiment, the inner housing 422 may not have an inner wall separated from an outer wall as described above. Instead, the inner housing 422 may only include the outer wall 422*a* may define a groove 424 formed within a radially inner surface of the inner housing 422. In this way, the dielectric resin may fill the groove 424 when injected in a liquid state. The resin may then be cured in place. Accordingly, the cured resin dielectric 423, when cured, may substantially fill the groove 424. This may facilitate maintaining the location of the cured resin dielectric 423 relative to the inner housing 422.

Figure 8:
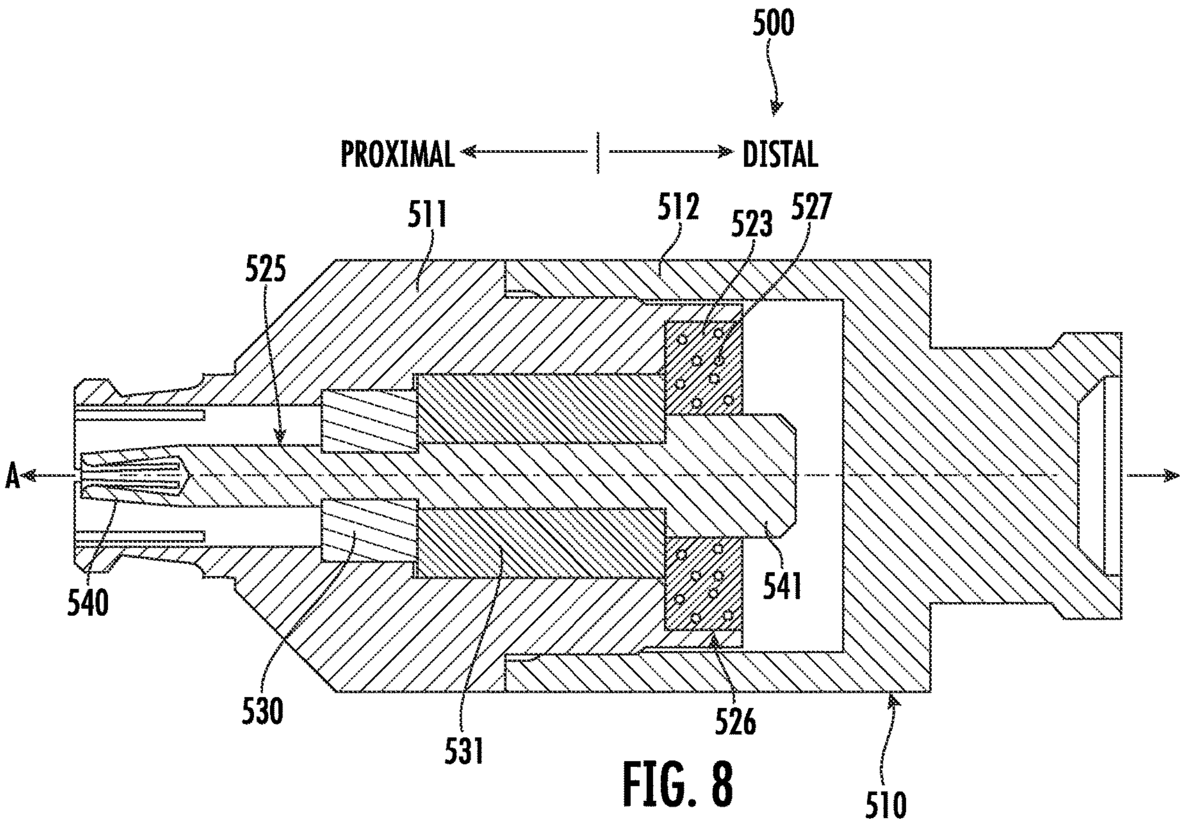
FIG. 8 schematically illustrates a cross-sectional view of a coaxial RF terminator, according to one or more embodiments shown and described herein.

Referring now to FIG. 8, a cross-sectional view of another embodiment of RF terminator 500 is schematically depicted. It is noted that the RF terminator 500 is substantially similar to the above-described RF terminator 400, 300, and/or 100. Accordingly, description of like components may apply equally to the present embodiment unless otherwise noted or apparent. For example, RF terminator 500 generally includes an outer housing 510 including a first portion 511 and second portion 512, support elements 530 and 531, center conductor 525, and resistive element 526. However, in the present embodiment, there is not inner housing. Other differences are outlined below.

In particular, in the present embodiment, the center conductor 525 has an integrated female connector as opposed to having a separated center conductor and female connector. For example, the center conductor 525 extends concentrically along the coaxial connection axis A and is supported therein via the support elements 530 and 531. In the present embodiment, the center conductor 525 has a female connecting end 540. The female connecting end 540 may be substantially similar to the first female connecting end 42*a* of female connector 40 of RF terminator 100, shown in FIG. 2 and described above. In this way, RF terminator 500 need not include a female connector distinct from the center conductor 525. However, it is contemplated that, in other embodiments, a female connector distinct from the center conductor 525 may be included.

In the present embodiment, RF terminator 500 further includes a resistive element 526 positioned distally of support element 531. As depicted, the resistive element 526 may encircle and abut a portion of the center conductor 525, such as around a distal end 541 of the center conductor 525. For example, the resistive element 526 may be positioned within and abutting the first portion 511 of outer housing 510. As depicted, the resistive element 526 may have a shape similar to a hollow cylinder; however other shapes are contemplated and possible. The resistive element 526 may include an electrically resistive material. In particular, the resistive element 526 may include a conductive particulate 527. The conductive particulate 527 may be any conductive material such as copper, gold, silver, platinum, nickel, or the like, The conductive particulate 527 may be suspended within a supporting material such as a cured resin dielectric 523 so as to form a shape that abuts both the center conductor 525 and outer housing 510. When the conductive particulate 527 is suspended within a supporting material, such as a cured resin dielectric 523, the resulting resistive element 526 may be electrically conductive with a predetermined resistance. This predetermined resistance may be a resistance between 25-100 ohms, such as 50 ohms. In this way, an RF signal may travel from the center conductor 525, through the conductive particulate 527, which may be suspended in a cured resin dielectric 523, and to the outer housing 510. In embodiments, the cured resin dielectric 523 may be epoxy resin, urethane resin, silicone resin, and the like. In embodiments, the resin dielectric material may be injected into a space between the center conductor 525 and the outer housing 10 (such as the first portion 11 of the outer housing 10) and cured in place. Accordingly, the resistive element 526 may support the center conductor 525 within the outer housing 510 and provide a resistance along the electrical pathway, to provide for signal termination.

Figure 9:
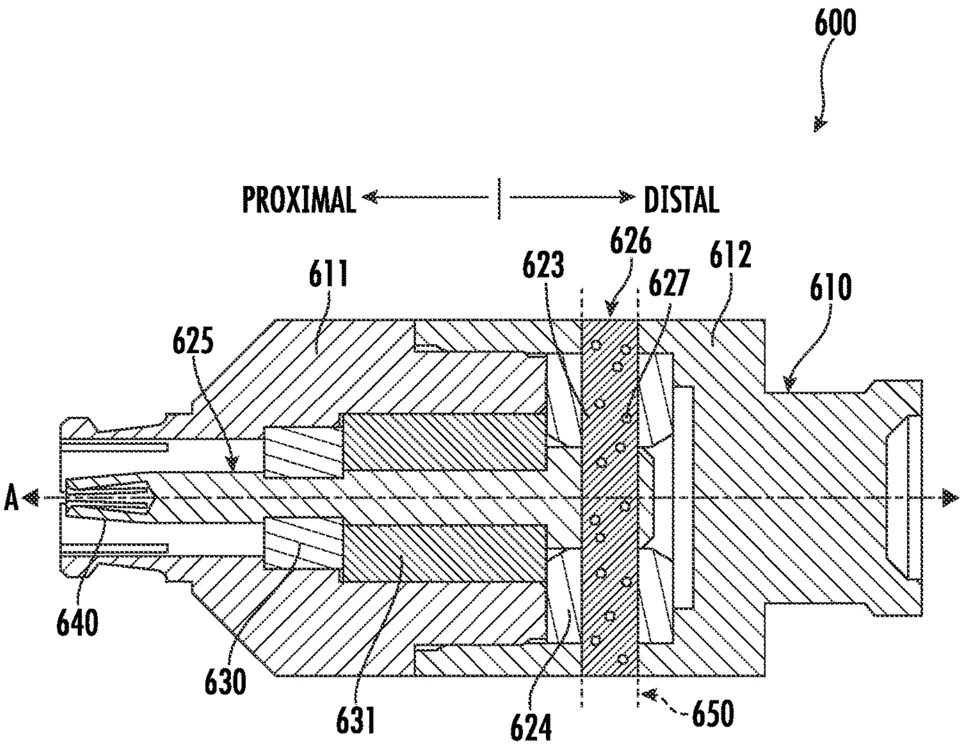
FIG. 9 schematically illustrates a cross-sectional view of a coaxial RF terminator, according to one or more embodiments shown and described herein.

Referring now to FIG. 9, a cross-sectional view of another embodiment of RF terminator 600 is schematically depicted. It is noted that the RF terminator 600 is substantially similar to the above-described RF terminator 500, 400, 300, and/or 100. Accordingly, description of like components may apply equally to the present embodiment unless otherwise noted or apparent. For example, RF terminator 600 generally includes an outer housing 610, center conductor 625, and support elements 630 and 631, such as described above. The center conductor 625 may include a female connector 640, such as described above.

In the present embodiment, RF terminator 600 includes the cured resin dielectric 624 that is positioned within the outer housing 610 and distal relative to the support element 631. The cured resin dielectric 624 may encircle a portion of center conductor 625 such as a distal end of center conductor 625 as shown. The cured resin dielectric 624 may be made out of an electrically resistive material.

Each of the cured resin dielectric 624, the center conductor 525, and the outer housing 610 may include a through-hole or passageway. The respective though-holes may be substantially aligned such that they form a continuous injection passage 650 extending through the cured resin dielectric 624, the center conductor 525, and the outer housing 610, as shown. The continuous injection passage 650 may substantially cylindrical, though other shapes are contemplated and possible.

The continuous injection passage 650 may be formed by a variety of methods. In particular, the continuous injection passage 650 may be formed by assembling the cured resin dielectric 624, the center conductor 525, and the outer housing 610 and machining or boring the continuous injection passage 650 therethrough. Alternatively, the continuous injection passage 650 may be formed by assembling the cured resin dielectric 624, the center conductor 525, and the outer housing 610, each having a preformed through-hole, thereby creating the continuous injection passage 650.

Resistive element 626 may be disposed within continuous injection passage 650. For example, the resistive element 626 may include a conductive particulate 627 suspended in a cured resin dielectric 623 such as described above. The conductive particulate 627 suspended in a liquid form of the resin dielectric may be injected into continuous injection passage 650 and cured in place. In this way, an RF signal may travel from the center conductor 625, through the resistive element 626 and to the outer housing 510

Figure 10:
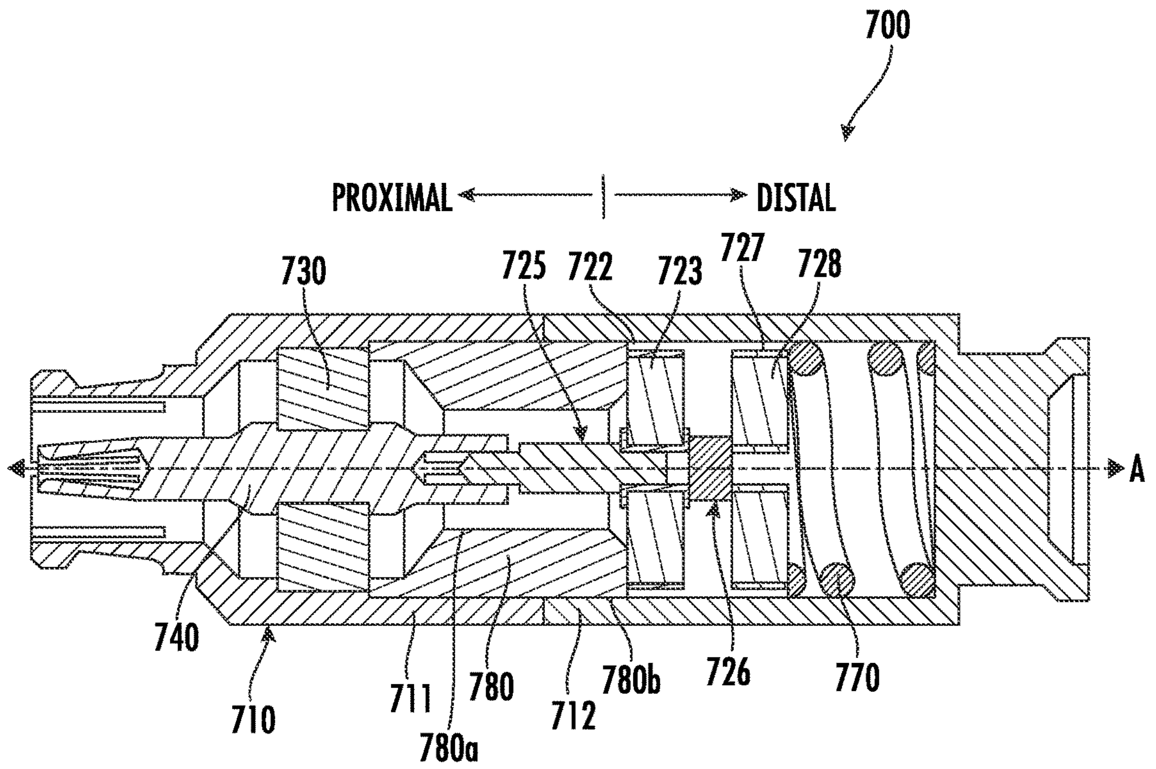
FIG. 10 schematically illustrates a cross-sectional view of a coaxial RF terminator, according to one or more embodiments shown and described herein.

Referring now to FIG. 10, a cross-sectional view of yet another embodiment of RF terminator 700 is schematically depicted. It is noted that the RF terminator 700 is substantially similar to the above-described RF terminator 600, 500, 400, 300, and 100. Accordingly, description of like components may apply equally to the present embodiment unless otherwise noted or apparent. For the example, the RF terminator 700 generally includes an outer housing 710 (which may include a first portion 711 and a second portion 712), a support element 730, a female connector 740, a center conductor 725, cured resin dielectric 723, inner housing 722, and a resistive element 726, such as described above.

In the depicted embodiment, the first portion 711 and the second portion 712 are not press fit together, instead, the first portion 711 abuts the second portion 712 such that the first portion 711 and second portion 712 may be joined with a butt weld, for example. In other embodiments, first portion 711 and second portion 712 may be joined with a different weld, press-fit connection, threaded connection, adhesive, or any other suitable connection.

Within the outer housing 710 and disposed between the support element 730 and the cured resin dielectric 723, the RF terminator 700 may include a metallic support element 780. The metallic support element 780 may define an inner wall 780*a* and an outer wall 780*b* that is positioned radially outward of inner wall 780*a*. The inner wall 780*a* may be offset from and coaxial with coaxial connection axis A such that the metallic support element 780 may surround a portion of the center conductor 725 and/or a portion of female connector 740 without contacting the center conductor 725 and/or female connector 740. Outer wall 780*b* may be radially outward of inner wall 780*a* such that it contacts the outer housing 710. The support element 730 may contact the cured resin dielectric 723 such that it supports the longitudinal position of the cured resin dielectric 723 within the outer housing 710.

Positioned distally of resistive element 726, the RF terminator 700 may include a spring support 728 and a spring support housing 727. The spring support housing 727 may be positioned within the outer housing 710. As depicted, the spring support housing 727 may be substantially cylindrical, though other shapes are contemplated and possible. The spring support housing 727 may be made from conductive material (e.g., copper, gold, silver, platinum, nickel, or the like).

The spring support 728 may be housed within the spring support housing 727. The spring support 728 may be shaped similar to a hollow cylinder, though other shapes are contemplated and possible. In particular, in embodiments, the spring support 728 may not be hollow at its center. The spring support 728 may be made from an electrically insulating material such as cured resin dielectric. The spring support 728 may instead be made from PCB material (e.g., epoxy, polyimide, Teflon, etc.) that is not cured in place.

Within the outer housing 710 and distal of the spring support 728, the RF terminator 700 may include a spring 770 formed from any appropriate spring material. In particular, the spring 770 may be made from a spring-form, metallic material such as spring steel. The length of the spring 770 may extend from the spring support 728 to the outer housing 710 in a distal direction such that it contacts both the spring support 728 and the outer housing 710. The diameter of the spring 770 may be sized such that the spring 770 contacts the outer housing 710 in the radial direction.

The resistive element 726 may be coupled at a first end to the center conductor 725, such as described above. The resistive element 726 may be coupled at a second end to the spring support housing 727 such that the resistive element 726 and the spring support housing 727 are in electrical communication. The spring support housing 727 may be in electrical communication with the spring 770, which may in turn be in electrical communication with the outer housing 710. The electrical communication between the spring 770 and the outer housing 710 may operate to ground the circuit of the RF terminator 700. Additionally, the spring 770 may operate to retain the spring support 728 in place within the RF terminator 700.

Figure 11:
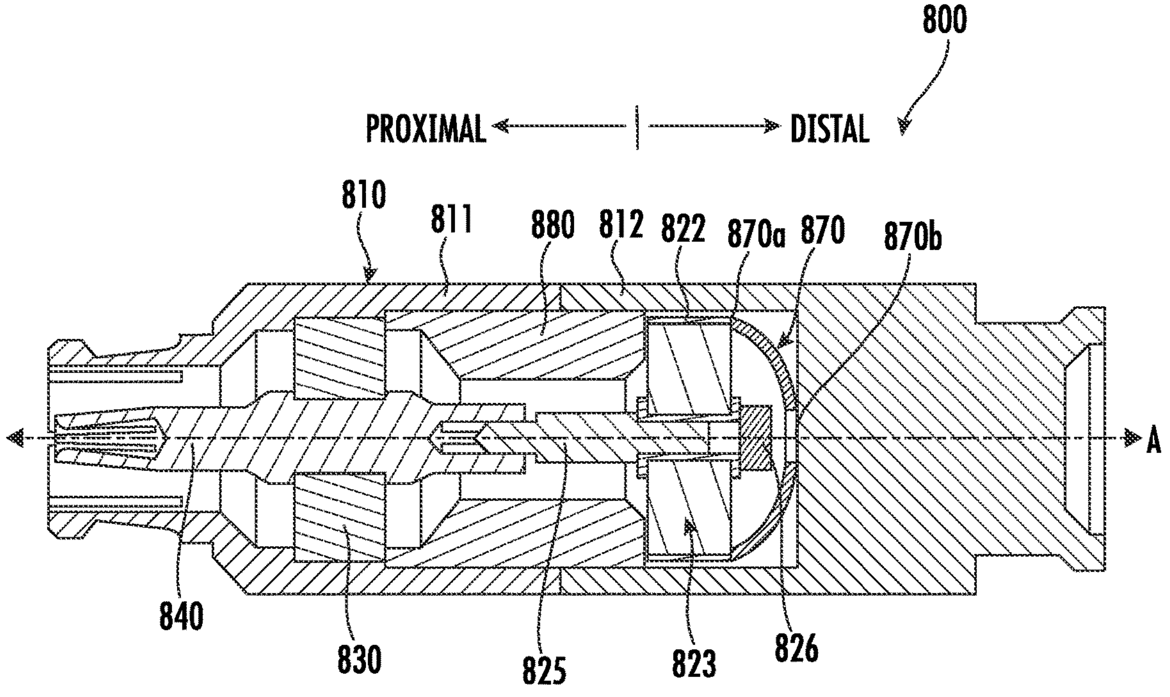
FIG. 11 schematically illustrates a cross-sectional view of a coaxial RF terminator, according to one or more embodiments shown and described herein.

Referring now to FIG. 11, a cross-sectional view of another embodiment of RF terminator 800 is schematically depicted. It is noted that the RF terminator 800 is substantially similar to the above-described RF terminator 700, 600, 500, 400, 300, and/or 100. Accordingly, description of like components may apply equally to the present embodiment unless otherwise noted or apparent. For the example, the RF terminator 800 generally includes an outer housing 810, which may include a first portion 811 and a second portion 812, a center conductor 825, a female connector 840, a support element 830, a metallic support element 880, a cured resin dielectric 823, an inner housing 822, and a resistive element 826, such as described above.

Within outer housing 810 and distal of the cured resin dielectric 823, RF terminator 800 may further include a domed spring 870. The domed spring 870 may be formed of a spring-form, metallic material such as spring steel. As depicted, the domed spring 870 may be substantially dome shaped such that it contacts an outer radius of the inner housing 822 at its proximal end 870*a* and contacts a radially centered portion of the outer housing 810 at its distal end 870*b*. Accordingly, the resistive element 826 is disposed within the dome shape of domed spring 870 and is not in contact with the domed spring 870.

It is noted that features of each of the above embodiments may be incorporated with one another, though described separately, without departing from the scope of the present disclosure. For example, one or more features described with respect to the RF terminator 100, 300, 400, 500, 600, 700, 800 and/or the resistor assembly 20, 200 may be interchanged.

In view of the above, it should now be understood that at least some embodiments of the present disclosure are directed to RF terminators that generally include a female connector, an outer housing, at least one support element, a center conductor, a cured resin dielectric, and one or more resistive elements. The female connector is configured to receive a male pin of a coaxial equipment port (not shown) and is disposed within the outer housing and is supported within the outer housing by the at least one support element. The center conductor may include a proximal portion and a distal portion and may be coaxially coupled to the female connector at the proximal portion and encircled by the cured resin dielectric at the distal portion. The cured resin dielectric is cured in place between the center conductor and the outer housing. The one or more resistive elements may be mounted to the center conductor and may be in electrical communication at a first end with the center conductor and at a second end with the outer housing. In this way, an RF signal received from the male pin may travel through the female connector, through the center conductor, through the resistive element, and then to the outer housing, which may be grounded, such that the RF signal is terminated with minimal reflection. As noted above, the cured dielectric resin may be cured in place thereby filling substantially all of the voids between the center conductor and the outer housing or any intervening components, thus providing improved signal isolation and termination.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A coaxial terminator for terminating a coaxial equipment port comprising:

a female connector, an outer housing, at least one support element, a center conductor, a cured resin dielectric, and one or more resistive elements, wherein:

the female connector is disposed within the outer housing, supported within the outer housing by the at least one support element, and configured to receive a male pin of the coaxial equipment port;

the center conductor has a proximal portion and a distal portion and is coaxially coupled to the female connector at the proximal portion and encircled by the cured resin dielectric at the distal portion;

the cured resin dielectric is cured in place between the center conductor and the outer housing; and the one or more resistive elements are in electrical communication at a first end with the center conductor and at a second end with the outer housing, and wherein a gap is disposed between the one or more resistive elements and the outer housing.

2. The coaxial terminator of claim 1, further comprising a tuning screw threadedly engaged with the outer housing, wherein advancing the tuning screw decreases the gap, thereby adjusting an inductance of the coaxial terminator.

3. The coaxial terminator of claim 1, further comprising an inner housing encircling the cured resin dielectric, wherein the inner housing is formed of a conductive material and is positioned coaxially within the outer housing such that the inner housing and the outer housing are in electrical communication.

4. The coaxial terminator of claim 1, wherein the outer housing comprises a first portion and a second portion press-fit within the first portion.

5. The coaxial terminator of claim 1, wherein the at least one support element comprises dielectric material.

6. The coaxial terminator of claim 1, wherein:

the at least one support element comprises a first support element and a second support element, and the first support element maintains a coaxial orientation of the female connector relative to the outer housing.

7. The coaxial terminator of claim 6, wherein the second support element maintains a coaxial orientation of the female connector relative to the center conductor.

8. The coaxial terminator of claim 1, wherein the center conductor is press-fit within the female connector.

9. The coaxial terminator of claim 1, wherein the one or more resistive elements are made of a conductive particulate suspended within the cured resin dielectric.

10. A coaxial terminator for terminating a coaxial equipment port comprising:

a female connector, an outer housing, at least one support element, a center conductor, a cured resin dielectric, an inner housing, and one or more resistors, wherein:

the female connector is disposed within the outer housing, supported within the outer housing by the at least one support element, and configured to receive a male pin of the coaxial equipment port;

the center conductor has a proximal portion and a distal portion and is formed integrally with the female connector at the proximal portion and encircled by the cured resin dielectric at the distal portion;

the cured resin dielectric is cured in place between the center conductor and the outer housing; and the one or more resistors are in electrical communication at a first end with the center conductor and at a second end with the outer housing.

11. The coaxial terminator of claim 10, wherein the one or more resistors comprise a first resistor and a second resistor, wherein each of the first resistor and the second resistor are in electrical communication with the center conductor and the outer housing such that the first resistor and the second resistor operate in parallel.

12. The coaxial terminator of claim 11, wherein the center conductor defines a longitudinal axis, wherein the first resistor and the second resistor are directionally oriented radially away from the longitudinal axis.

13. The coaxial terminator of claim 11, further comprising a distal dielectric disposed within the inner housing, wherein the one or more resistors are in electrical communication at the first end to the center conductor and at the second end to the inner housing.

14. The coaxial terminator of claim 11, further comprising a spring extending between the inner housing and the outer housing.

15. The coaxial terminator of claim 10, wherein the one or more resistors are soldered at the first end to the center conductor and at the second end to the inner housing, wherein the cured resin dielectric is cured in place within the inner housing.

16. The coaxial terminator of claim 10, wherein the one or more resistors includes a chip resistor.

17. A method of assembling a coaxial terminator comprising:

positioning an inner housing about a distal portion of a center conductor;

injecting a resin dielectric into the inner housing such that it is encircling the distal portion of the center conductor;

curing the resin dielectric about the distal portion of the center conductor;

coupling a first resistor at a first end to the center conductor and at a second end to the inner housing such that the first resistor is in electrical communication with the center conductor and the inner housing; and enclosing the center conductor, the resin dielectric, and the first resistor within an outer housing.

18. The method of claim 17, further comprising:

coaxially coupling a proximal portion of the center conductor to a female connector, wherein the female connector is configured to receive a male pin of a coaxial equipment port.

19. The method of claim 17, further comprising:

coupling a second resistor to the center conductor and the inner housing such that the second resistor is in electrical communication with the center conductor and the inner housing.

20. A coaxial terminator for terminating a coaxial equipment port comprising:

a female connector, an outer housing, at least one support element, a center conductor, a cured resin dielectric, one or more resistive elements, and a tuning screw threadedly engaged with the outer housing, wherein advancing the tuning screw decreases the gap, thereby adjusting an inductance of the coaxial terminator, wherein:

the female connector is disposed within the outer housing, supported within the outer housing by the at least one support element, and configured to receive a male pin of the coaxial equipment port;

the center conductor has a proximal portion and a distal portion and is coaxially coupled to the female connector at the proximal portion and encircled by the cured resin dielectric at the distal portion;

the cured resin dielectric is cured in place between the center conductor and the outer housing; and the one or more resistive elements are in electrical communication at a first end with the center conductor and at a second end with the outer housing.

21. A coaxial terminator for terminating a coaxial equipment port comprising:

a female connector, an outer housing, at least one support element, a center conductor, a cured resin dielectric, and one or more resistive elements, wherein:

the female connector is disposed within the outer housing, supported within the outer housing by the at least one support element, and configured to receive a male pin of the coaxial equipment port;

the center conductor has a proximal portion and a distal portion and is coaxially coupled to the female connector at the proximal portion and encircled by the cured resin dielectric at the distal portion;

the cured resin dielectric is cured in place between the center conductor and the outer housing; and the one or more resistive elements are in electrical communication at a first end with the center conductor and at a second end with the outer housing, and wherein the one or more resistive elements are made of a conductive particulate suspended within the cured resin dielectric.

* * * * *